(12) United States Patent
Bang

(10) Patent No.: US 6,700,337 B2
(45) Date of Patent: Mar. 2, 2004

(54) APPARATUS FOR GENERATING DYNAMIC FOCUS SIGNAL

(75) Inventor: Jeong-Ho Bang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/216,288

(22) Filed: Aug. 12, 2002

(65) Prior Publication Data

US 2003/0034745 A1 Feb. 20, 2003

(30) Foreign Application Priority Data

Aug. 14, 2001 (KR) ........................................ 2001-49035

(51) Int. Cl.$^7$ ................................................ H04N 9/06
(52) U.S. Cl. .................. 315/382; 315/368.21; 315/370; 358/44
(58) Field of Search ................................. 315/282, 370, 315/371, 382, 382.1, 384, 368.22, 368.18, 411, 368.21; 348/807, 806; 358/44, 45, 46

(56) References Cited

U.S. PATENT DOCUMENTS

| | | | | |
|---|---|---|---|---|
| 4,360,826 A | * | 11/1982 | Miyazaki et al. | 358/44 |
| 5,977,728 A | * | 11/1999 | Kwon | 315/382 |
| 6,078,151 A | * | 6/2000 | Kudo | 315/382 |
| 6,380,988 B1 | * | 4/2002 | Sung | 348/745 |

* cited by examiner

*Primary Examiner*—Wilson Lee
(74) *Attorney, Agent, or Firm*—Robert E. Bushnell, Esq.

(57) ABSTRACT

An apparatus for generating a dynamic focus signal appropriate for a flat-type CDT, or flat-screen CRT has a first multiplier for receiving a horizontal sawtooth wave and outputting the square component of the wave; a second multiplier for receiving a vertical sawtooth wave and outputting the square component of the wave; a third multiplier for multiplying the outputs of the first and the second multipliers; and a mixer for mixing the outputs of the first through the third multipliers and outputting the result as a dynamic focus signal. The apparatus is able to perform optimal focus control appropriate for a flat-screen CRT.

11 Claims, 5 Drawing Sheets

$V_1 = V_2$ $V_1 < V_2$

US 6,700,337 B2

APPARATUS FOR GENERATING DYNAMIC FOCUS SIGNAL

CLAIM OF PRIORITY

This application makes reference to, incorporates the same herein, and claims all benefits accruing under 35 U.S.C §119 from an application entitled Apparatus For Generating Dynamic Focus Signal earlier filed in the Korean Industrial Property Office on Aug. 14, 2001, and there duly assigned Serial No. 2001-0049035 by that Office.

BACKGROUND OF THE INVENTION

1. Field of the Invention

The present invention relates to an apparatus for generating a dynamic focus signal in a display apparatus using a Cathode Display Tube (CDT) or, and more particularly, to an apparatus for generating a dynamic focus signal appropriate for a flat-type CDT, or flat-screen Cathode Ray Tube (CRT).

2. Description of the Related Art

Since distances from the electron gun to each area of the screen are different in a display apparatus using a CDT or CRT, dynamic focus for adjusting the focus of an electron beam with respect to an area of the screen is needed so that an electron beam generated in the electron gun is landed with a correct focus.

That is, since the distance between the electron gun and the center of the screen is short, an electron beam directed to the center of the screen is needed to correspond to a short focal length. However, the distance between the electron gun and the right or left area of the screen is longer than that between the electron gun and the center of the screen, an electron beam directed to the right or left area of the screen is needed to correspond to a longer focal length. As this, adjusting the focal length of an electron beam with respect to an area of the screen is referred to as dynamic focus.

The focus of an electron beam is controlled by a focus signal applied to the focus electrode of the electron gun.

FIG. 1 is a waveform diagram of exemplary focus signals. The focus signals of FIG. 1 show the waveforms of horizontal focus signals and a vertical focus signal in one vertical cycle. Referring to FIG. 1, each horizontal focus signal has high levels at the beginning and end of a horizontal scanning period, and has a low level in the middle area of the horizontal scanning period. According to this, in one horizontal cycle, the focus voltages of the left and right areas in the screen are different from the focus voltage of the center of the screen.

Meanwhile, in the waveforms of FIG. 1, in one vertical cycle, the waveform of each horizontal focus signal is uniform. This means that horizontal dynamic focus controls for the center and corners of the screen are done in a uniform way.

Though with the focus signals shown in FIG. 1, correct focus may be achieved to a degree in an ordinary non-flat-screen CRT, precise focus cannot be achieved in a flat-screen CRT which is used now or will be used in the future.

The reason is because the distance between the electron gun and the corners of the screen (the top left-hand corner, top right-hand corner, bottom left-hand corner, and bottom right-hand corner) of the flat-screen CRT is longer than that of the conventional non-flat-screen CRT s. Therefore, with the dynamic focus signal having the same amplitude (V2) of the horizontal focus signal for each corner of the screen as the amplitude (V1) of the horizontal focus signal for the center of the screen, as shown in FIG. 1, it is difficult to adjust focuses for corner areas of the screen.

SUMMARY OF THE INVENTION

To solve the above problems, it is an objective of the present invention to provide an apparatus for generating a dynamic focus waveform appropriate for a flat-type CDT, or flat-screen CRT.

To accomplish the objective of the present invention, there is provided an apparatus for generating a dynamic focus signal appropriate for a flat-screen CRT, the apparatus having a first multiplier for receiving a horizontal sawtooth wave and outputting the square component of the wave; a second multiplier for receiving a vertical sawtooth wave and outputting the square component of the wave; a third multiplier for multiplying the outputs of the first and the second multipliers; and a mixer for mixing the outputs of the first through the third multipliers and outputting the result as a dynamic focus signal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
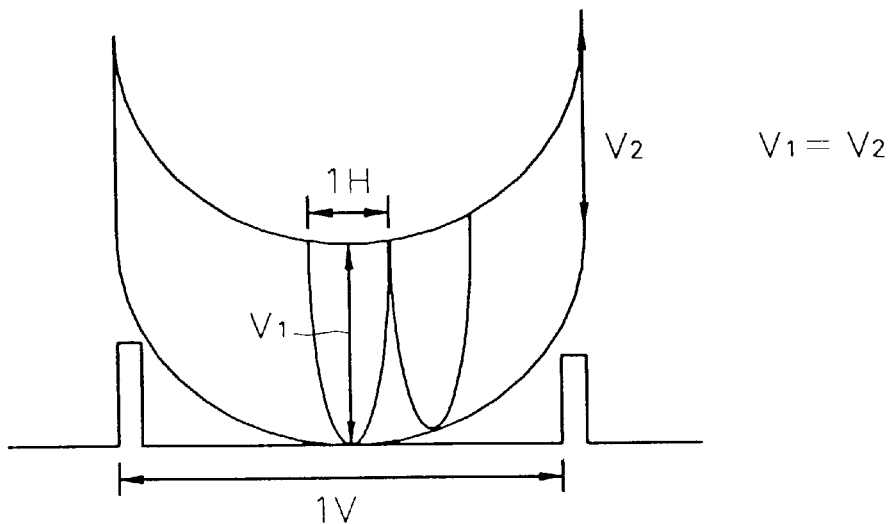
FIG. 1 is a waveform diagram of exemplary dynamic focus signals.
Figure 2:
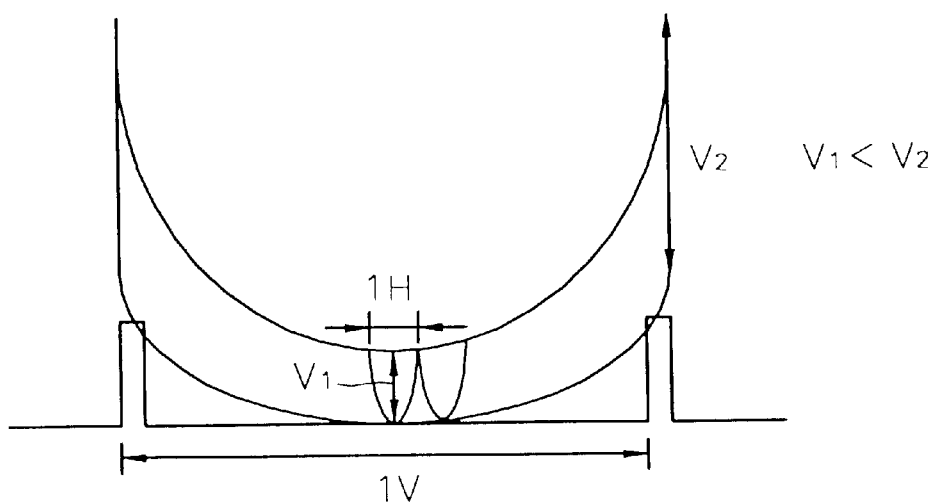
FIG. 2 is a waveform diagram of focus signals appropriate for a flat-screen CRT.

FIG. 2 is a waveform diagram of a focus signal appropriate for a flat-screen CRT. Compared to the waveform of FIG. 1, the waveform of FIG. 2 has a horizontal focus signal, of which waveform is not uniform, in a vertical cycle.

That is, the amplitude (V2) of each horizontal focus signal of the beginning area and ending area of a vertical cycle is greater than the amplitude (V1) of the horizontal focus signal of the middle area of the vertical cycle.

According to this difference, the focus voltage of each corner of the screen is higher than that of the center of the screen so that precise focus control is enabled.

Figure 3:
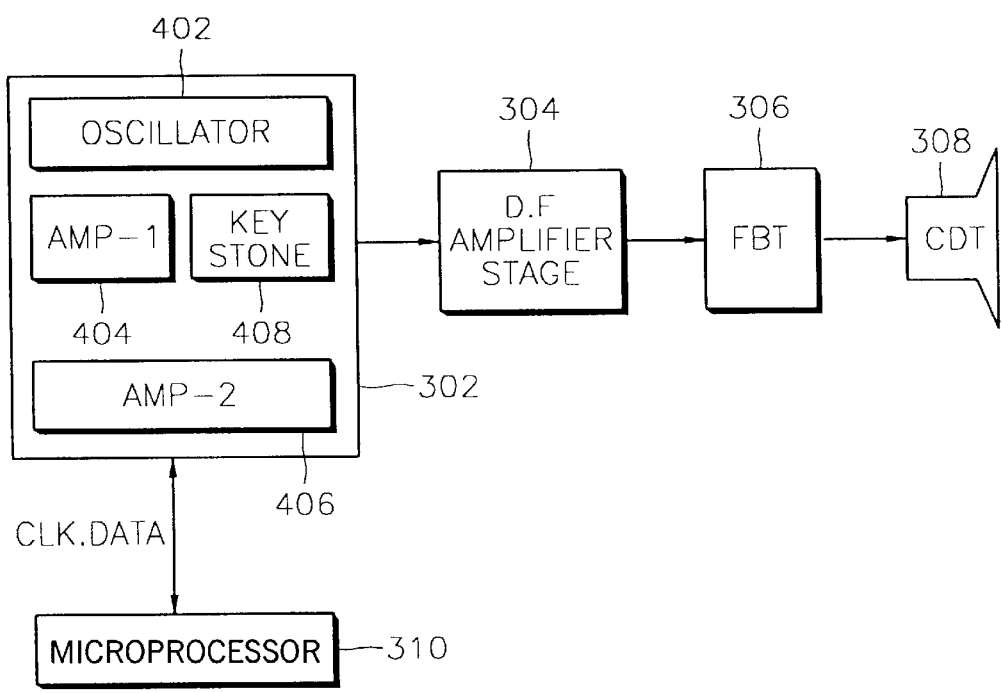
FIG. 3 is a block diagram of a dynamic focus circuit adopting an apparatus for generating a dynamic focus signal according to the present invention.

FIG. 3 is a block diagram of a dynamic focus circuit adopting an apparatus for generating a dynamic focus signal according to the present invention.

The apparatus of FIG. 3 includes a horizontal and vertical processor 302, a dynamic focus amplifier 304, a Fly-Back Transformer (FBT) 306, a flat-screen CRT 308, and a microprocessor 310.

The horizontal and vertical processor 302 includes a dynamic focus signal oscillator 402 for generating a dynamic focus signal, a first gain adjusting unit 404 for adjusting the gain of the dynamic focus signal generated in the dynamic focus signal oscillator 402, a second gain adjusting unit 406 for adjusting the gain of each horizontal focus signal in a vertical cycle, and a key stone 408 for adjusting the gain difference of the back porch and the front porch of the dynamic focus waveform.

The microprocessor 310 controls the gain adjusting units 404 and 406 and the key stone 408 in the horizontal and vertical processor 302. Control data in the microprocessor 310 is provided to the gain adjusting units 404 and 406 in the horizontal and vertical processor 302 in serial communications.

Meanwhile, the dynamic focus amplifier 304 amplifies a dynamic focus signal generated in the horizontal and vertical processor 302, and the FBT 306 mixes the amplified dynamic focus signal and a DC focus voltage and provides the mixed signal to the electron gun of the CDT 308.

Figure 4:
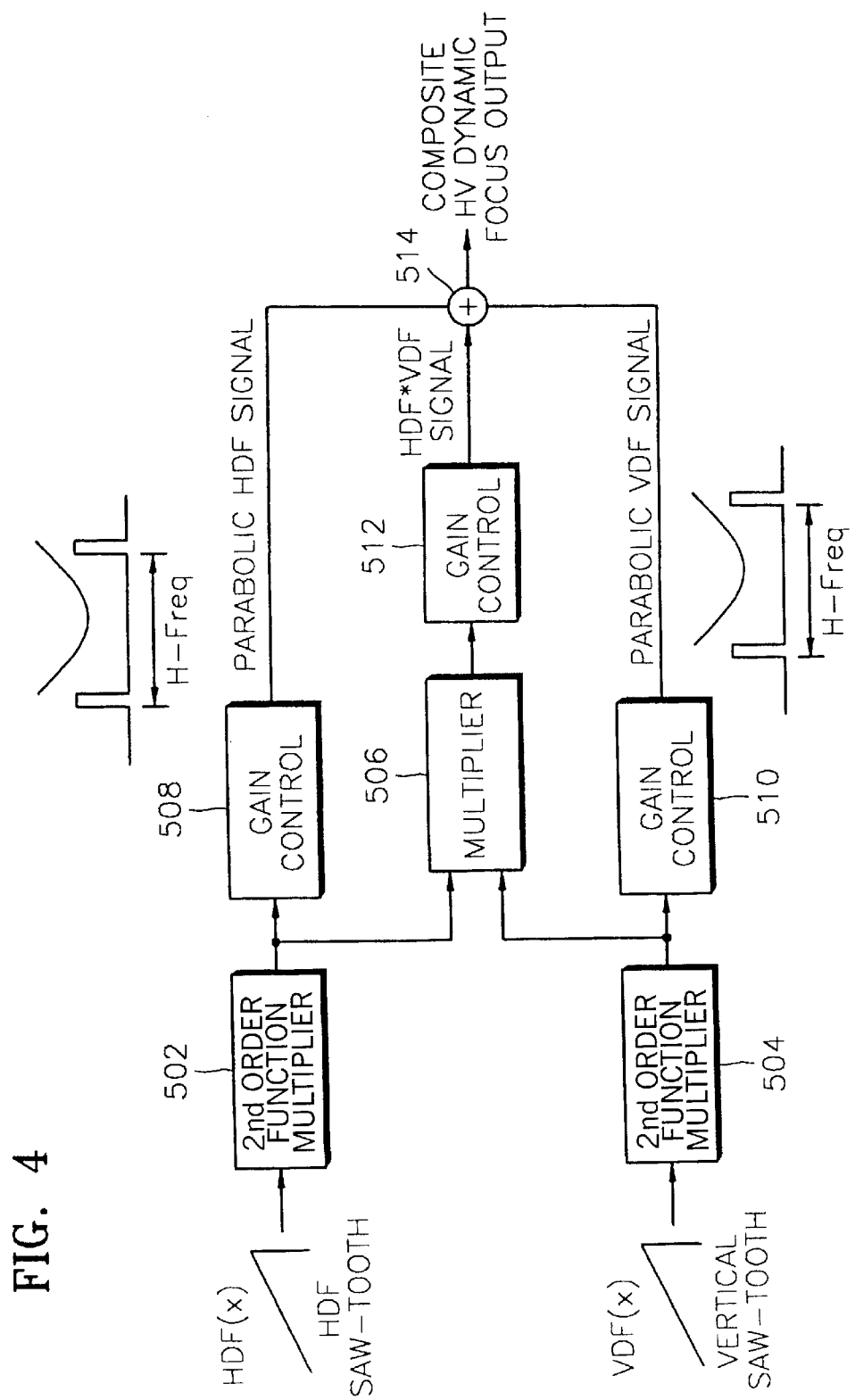
FIG. 4 is a detailed block diagram of a dynamic focus signal oscillator of FIG. 3.

FIG. 4 is a detailed block diagram of the dynamic focus signal oscillator 402 of FIG. 3. The oscillator of FIG. 4 includes first, second and third multipliers 502, 504 and 506, first, second and third gain controllers 508, 510 and 512, and a mixer 514.

The first multiplier 502 receives a horizontal sawtooth wave (HDF) having a horizontal frequency, and the second multiplier 504 receives a vertical sawtooth wave (VDF) having a vertical frequency.

The first multiplier 502 and the second multiplier 504 are 2ND order multipliers that output the square components of the horizontal sawtooth wave (HDF) and the vertical sawtooth wave (VDF), respectively. That is, each of the first multiplier 502 and the second multiplier 504 outputs the result of quadratic equation calculation of the input signal.

The multiplication results of the first multiplier 502 and the second multiplier 504 are a parabolic HDF signal and a parabolic VDF signal, respectively.

Meanwhile, the third multiplier 506 multiplies the outputs of the first multiplier 502 and the second multiplier 504 and then outputs the resulting product.

The first through third gain controllers 508 through 512 adjust the outputs of the first through third multipliers 502 through 506, respectively. The mixer 514 mixes the outputs of the first through third gain controllers 508 through 512, and outputs the mixed result. The gains of first through third gain controllers 508 through 512 are controlled by the microprocessor 310 in response to the vertical and horizontal sync signals. The control signals from the microprocessor 310 are transmitted serially to the gain controllers 508 through 512. The dynamic focus signal, as shown in FIG. 2, is obtained from the output of the mixer 514.

When HDF(x) denotes the horizontal sawtooth wave (HDF) and VDF(x) denotes the vertical sawtooth wave (VDF), $$\text{Parabolic HDF signal} = A \times HDF(x) \times HDF(x) \quad (1)$$

$$\text{Parabolic VDF signal} = B \times VDF(y) \times VDF(y) \quad (2)$$

$$\text{Composite HV dynamic focus signal} = A \times HDF(x) \times HDF(x) + B \times VDF(y) \times VDF(y) + C \times HDF(x) \times HDF(x) \times VDF(y) \times VDF(y) \quad (3)$$

Here, A, B, and C denote the amplification degrees of the first through third gain controllers 508 through 512, respectively.

Accordingly, due to the last term, C×HDF(x)×HDF(x)×VDF(y)×VDF(y), the feature that the maximum value of the focus signal for the center of the screen is different from the maximum values of the focus signal for the outer area inside the screen, which is the purpose of the present invention, is obtained.

Figure 5:
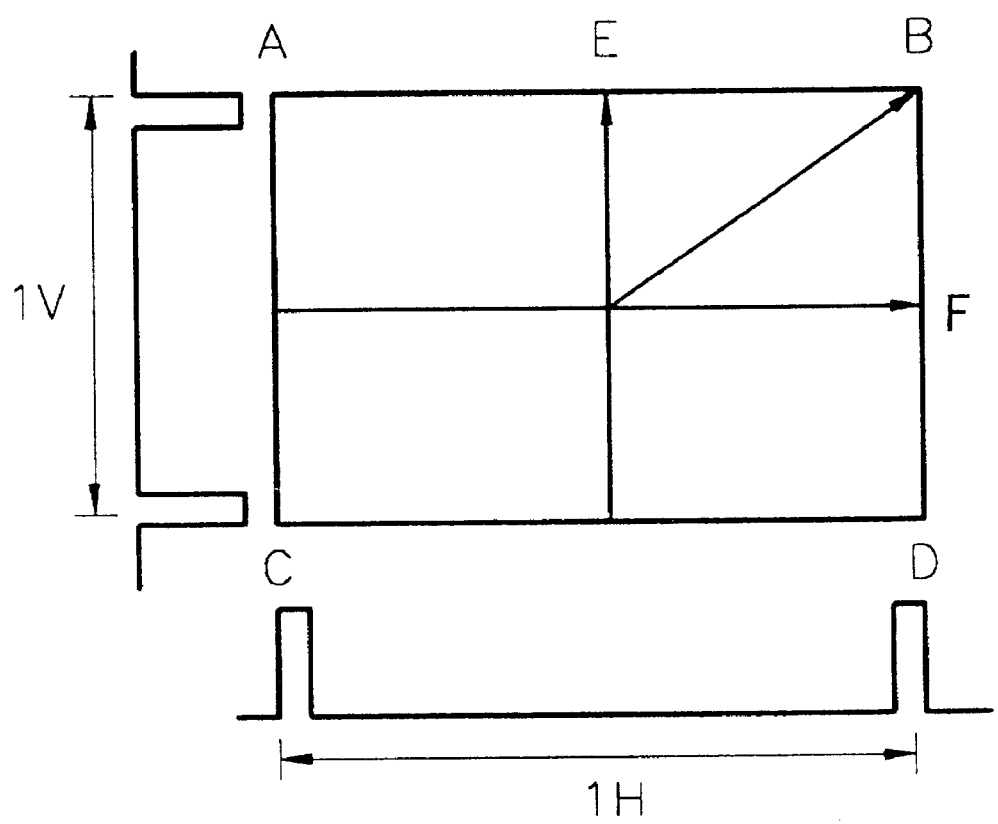
FIG. 5 is an example of dynamic focus voltage needed in a flat-screen CRT.

FIG. 5 is an example of dynamic focus voltages needed in a flat-screen CRT, taking into account horizontal=350 V, vertical=150 V, plus a DC voltage, the center area of the screen should be 6.00 KV, the top center of the screen (E of FIG. 5) should be 6.15 KV, the right center of the screen (F of FIG. 5) should be 6.35 KV, and each of the corners of the screen (A through D of FIG. 5) should be 6.50 KV. However, in each of the corners (A through D) actually needs about 6.6 KV.

Figure 6:
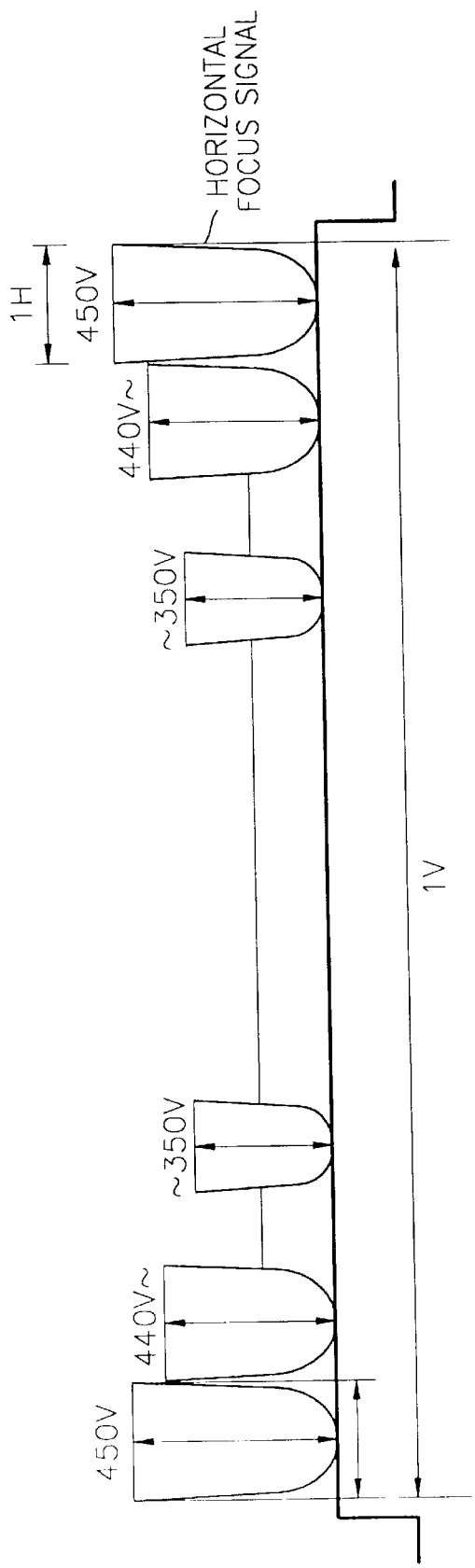
FIG. 6 is an example of a dynamic focus signal generated by the apparatus for generating a dynamic focus signal according to the present invention.

FIG. 6 is an example of a dynamic focus signal generated by the apparatus for generating a dynamic focus signal according to the present invention.

In the dynamic focus signal of FIG. 6, the amplitude (V2) of each of the beginning part and the ending part of the horizontal focus signal in a vertical cycle is greater than the amplitude (V1) of the horizontal focus signal of the middle part in the vertical cycle.

That is, the amplitude (450 V) of the horizontal focus signal of each of the beginning part and the ending part in the vertical cycle is greater than the amplitude (350 V) of the horizontal focus signal of the middle part in the vertical cycle. Also, the level of the peak value of each horizontal focus signal in the vertical cycle changes forming a semi-circle shape (450 V→440 V→. . . →350 V→350 V→350 V→440 V→450 V).

As described above, in the apparatus and method for generating a focus signal according to the present invention, by generating a focus signal having different maximum values in the central area and in the outer area inside the screen appropriate for a flat-screen CRT, optimum focus control is performed.

What is claimed is:

1. An apparatus for generating a dynamic focus signal appropriate for a cathode display tube (CDT), the apparatus comprising:

a first multiplier for receiving a horizontal sawtooth wave and outputting a square component of the horizontal sawtooth wave;

a second multiplier for receiving a vertical sawtooth wave and outputting a square component of the vertical sawtooth wave;

a third multiplier for multiplying the square components output from the first and the second multipliers; and a mixer for mixing the square components output from the first and second multipliers with an output of the third multiplier to output a dynamic focus signal.

2. The apparatus of claim 1, further comprising:

first, second and third gain controllers, each of which is placed between respective ones of the first, second and third multipliers and the mixer, said first and second gain controllers adjusting gain of the square components output from the respective first and second multipliers for input to said mixer, and said third gain controller adjusting gain of the output of the third multiplier for input to said mixer.

3. The apparatus of claim 2, further comprising:

a microprocessor for controlling the first, second and third gain controllers so as to control an amplification degree of each of the gain controllers.

4. The apparatus of claim 3, further comprising said microprocessor being responsive to vertical and horizontal synchronization signals.

5. An apparatus for generating a dynamic focus signal appropriate for a flat-screen cathode ray tube (CRT), the apparatus comprising:

a first multiplier for receiving a horizontal sawtooth wave and outputting a first square wave signal;

a second multiplier for receiving a vertical sawtooth wave and outputting a second square wave signal;

a third multiplier for multiplying the first and second square wave signals and outputting a wave product; and a mixer for outputting a dynamic focus signal by adding the first square wave signal, the second square wave signal and the wave product.

6. The apparatus of claim 5, wherein said first and second multipliers are 2ND function multipliers applying a quadratic equation to obtain square components of the horizontal sawtooth wave and vertical sawtooth wave, respectively.

7. The apparatus of claim 5, further comprising:

a first gain controller for adjusting gain of the first square wave signal before the first square wave signal is applied to said mixer;

a second gain controller for adjusting gain of the second square wave signal before the second square wave signal is applied to said mixer; and a third gain controller for adjusting gain of the wave product before the wave product is applied to said mixer.

8. The apparatus of claim 7, further comprising a microprocessor for controlling the gain of said first, second and third gain controllers.

9. The apparatus of claim 8, further comprising said microprocessor being responsive to vertical and horizontal synchronization signals.

10. A method of generating a dynamic focus signal appropriate for a display tube, the method comprising steps of:

generating a first square wave signal in response to a received horizontal sawtooth wave;

generating a second square wave signal in response to a received vertical sawtooth wave;

generating a wave product by multiplying the first square wave signal by the second square wave signal; and generating the dynamic focus signal by mixing the first square wave signal, the second square wave signal and the wave product.

11. The method as set forth in claim 10, further comprising steps of:

adjusting gains of the first square wave signal, the second square wave signal and the wave product before mixing the first square wave signal, the second square wave signal and the wave product.

* * * * *